US007576941B1

(12) United States Patent
Chen et al.

(10) Patent No.: US 7,576,941 B1
(45) Date of Patent: Aug. 18, 2009

(54) DISK DRIVE WRITING WEDGE RRO VALUES IN A BUTTERFLY PATTERN

(75) Inventors: Teddy T. C. Chen, Huntington Beach, CA (US); Eugene Chun-Tsing Wu, Irvine, CA (US); John Yin Kwong Li, Laguna Niguel, CA (US); Jie Yu, Irvine, CA (US); Jonathan V. Nguyen, Laguna Niguel, CA (US); Tuong M. Vu, Lake Forest, CA (US); Guoxiao Guo, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/924,830

(22) Filed: Oct. 26, 2007

(51) Int. Cl.
*G11B 5/596* (2006.01)
(52) U.S. Cl. .................. 360/77.04; 360/77.08
(58) Field of Classification Search ................ None
See application file for complete search history.

(56) References Cited

U.S. PATENT DOCUMENTS

| 5,668,679 | A | 9/1997 | Swearingen et al. |
| 5,751,512 | A | 5/1998 | Anderson |
| 5,946,157 | A | 8/1999 | Codilian et al. |
| 5,991,115 | A | 11/1999 | Chainer et al. |
| 5,998,994 | A | 12/1999 | Mori |
| 6,023,389 | A | 2/2000 | Cunningham |
| 6,049,440 | A | 4/2000 | Shu |
| 6,061,201 | A | 5/2000 | Woods |
| 6,091,564 | A | 7/2000 | Codilian et al. |
| 6,141,175 | A | 10/2000 | Nazarian et al. |
| 6,304,407 | B1 | 10/2001 | Baker et al. |
| 6,317,285 | B1 | 11/2001 | Bi et al. |
| 6,411,453 | B1 | 6/2002 | Chainer et al. |
| 6,421,197 | B1 | 7/2002 | Abdelnour |

(Continued)

FOREIGN PATENT DOCUMENTS

JP 2000268516 A 9/2000

OTHER PUBLICATIONS

Tan et al., "Signal Processing for Perpendicular Recording Channels With Intertrack Interference", IEEE Transactions on Magnetics, Feb. 2005, pp. 730-735, vol. 41, No. 2.

(Continued)

*Primary Examiner*—Andrew L Sniezek
(74) *Attorney, Agent, or Firm*—Howard H. Sheerin, Esq.

(57) ABSTRACT

A disk drive is disclosed comprising a plurality of servo sectors that define a plurality of tracks, and a head comprising a read element radially offset from a write element. The read element is positioned over a first track, and the first track is read to generate first read wedge repeatable runout (WRRO) values. A first seek operation of the head positions the read element over a second track, and the second track is read to generate first write WRRO values. The first write WRRO values are used to write the first read WRRO values to the first track. A second seek operation of the head positions the read element over a third track, and the third track is read to generate second write WRRO values. The second write WRRO values are used to write the first write WRRO values to the second track.

23 Claims, 8 Drawing Sheets

U.S. PATENT DOCUMENTS

| | | | |
|---|---|---|---|
| 6,429,989 B1 | 8/2002 | Schultz et al. | |
| 6,493,173 B1 | 12/2002 | Kim et al. | |
| 6,507,450 B1 | 1/2003 | Elliott | |
| 6,510,017 B1 | 1/2003 | Abdelnour | |
| 6,519,107 B1 | 2/2003 | Ehrlich et al. | |
| 6,545,835 B1 | 4/2003 | Codilian et al. | |
| 6,580,579 B1 | 6/2003 | Hsin et al. | |
| 6,654,198 B2 | 11/2003 | Liu et al. | |
| 6,657,810 B1 | 12/2003 | Kupferman | |
| 6,671,119 B2 | 12/2003 | Baumann et al. | |
| 6,704,156 B1 | 3/2004 | Baker et al. | |
| 6,707,635 B1 | 3/2004 | Codilian et al. | |
| 6,738,205 B1 | 5/2004 | Moran et al. | |
| 6,754,030 B2 | 6/2004 | Seng et al. | |
| 6,775,091 B1 | 8/2004 | Sutardja | |
| 6,831,803 B2 | 12/2004 | Hsin | |
| 6,859,341 B2 | 2/2005 | Min et al. | |
| 6,924,959 B1 | 8/2005 | Melkote et al. | |
| 6,947,248 B2 | 9/2005 | Allen et al. | |
| 6,963,465 B1 | 11/2005 | Melkote et al. | |
| 6,963,466 B2 | 11/2005 | Baum et al. | |
| 6,965,491 B1 | 11/2005 | Perlmutter et al. | |
| 6,972,922 B1 | 12/2005 | Subrahmanyam et al. | |
| 6,977,792 B1 | 12/2005 | Melrose et al. | |
| 6,985,316 B1 | 1/2006 | Liikanen et al. | |
| 6,999,266 B1 | 2/2006 | Schmidt | |
| 7,027,256 B1 | 4/2006 | Subrahmanyam et al. | |
| 7,088,547 B1 | 8/2006 | Wang et al. | |
| 7,089,353 B2 | 8/2006 | Chainer et al. | |
| 7,099,105 B2 | 8/2006 | Ehrlich | |
| 7,106,542 B1 | 9/2006 | Sun et al. | |
| 7,106,547 B1 | 9/2006 | Hargarten et al. | |
| 7,119,981 B2 | 10/2006 | Hanson et al. | |
| 7,123,433 B1 | 10/2006 | Melrose et al. | |
| 7,130,146 B2 | 10/2006 | Ehrlich | |
| 7,133,243 B2 | 11/2006 | Hirano et al. | |
| 7,139,149 B1 | 11/2006 | Sun et al. | |
| 7,149,043 B2 | 12/2006 | Ehrlich | |
| 7,177,110 B2 | 2/2007 | Ehrlich et al. | |
| 7,180,696 B2 | 2/2007 | Ehrlich | |
| 7,193,808 B2 | 3/2007 | Takaishi | |
| 7,193,809 B1 | 3/2007 | Allen | |
| 7,199,962 B1 | 4/2007 | Ehrlich | |
| 7,304,819 B1 | 12/2007 | Melkote et al. | |
| 2002/0015253 A1 | 2/2002 | Litvinov et al. | |
| 2002/0036858 A1 | 3/2002 | Bi et al. | |
| 2003/0197968 A1 | 10/2003 | Sacks et al. | |
| 2003/0210060 A1 | 11/2003 | Schmid | |
| 2004/0061967 A1 | 4/2004 | Lee et al. | |
| 2004/0123025 A1 | 6/2004 | Chainer et al. | |
| 2005/0264917 A1 | 12/2005 | Yano et al. | |
| 2007/0047133 A1 | 3/2007 | Allen | |
| 2008/0002280 A1* | 1/2008 | Asakura | 360/76 |

OTHER PUBLICATIONS

U.S. Appl. No. 11/165,638, filed Jun. 23, 2005, 18 pages.
U.S. Appl. No. 11/847,110, filed Aug. 29, 2007, 23 pages.

* cited by examiner

DISK DRIVE WRITING WEDGE RRO VALUES IN A BUTTERFLY PATTERN

BACKGROUND

1. Field

The present invention relates to disk drives for computer systems. In particular, the present invention relates to a disk drive writing wedge RRO values in a butterfly pattern.

2. Description of the Related Art

Disk drives comprise a disk and a head connected to a distal end of an actuator arm which is rotated about a pivot by a voice coil motor (VCM) to position the head radially over the disk. The disk typically comprises a number of concentric data tracks each partitioned into a number of data sectors. Access operations are performed by seeking the head to a target data track, and performing a write/read operation on the data sectors within the data track. The disk typically comprises embedded servo sectors having position information recorded therein, such as coarse position information (e.g., a track address) and fine position information (e.g., servo bursts). A servo controller processes the servo sectors to position the head over the target data track.

The embedded servo sectors may be written to the disk using any suitable technique, such as with an external servo writer, a media writer, or self-servo written. An external servo writer writes the servo sectors by servoing the actuator arm (with a pin) while using the head internal to the disk drive to write the servo sectors, whereas a media writer writes the servo sectors onto a number of disks which are then inserted into production disk drives. Alternatively, each disk drive may self-servo write the servo sectors using any suitable technique, such as propagation or while following seed tracks, such as spiral tracks.

Regardless as to how the servo sectors are written, errors in the servo writing process typically means the servo sectors will define eccentric tracks. In addition, eccentricity may be due to the disk being clamped to the spindle motor after being servo written with a media writer, or if the disk slips after being clamped to the spindle motor. The eccentricity is referred to as repeatable runout (RRO) since the position error relative to the head will repeat each time the disk rotates. The RRO typically comprises a component based on the rotational frequency of the disk (fundamental or 1F frequency) as well as higher frequency components unique to each track.

To compensate for the eccentricity, RRO compensation values are generated and processed by the servo controller to either cancel or follow the eccentricity. RRO values corresponding to the fundamental frequency (and optionally the harmonics) are typically learned and then modeled with a sinusoid. The RRO values that correspond to the higher frequency components are typically generated for each track and then written at the end of each servo sector (referred to as wedge RRO values or WRRO values). As the servo controller reads each servo sector, an RRO compensation is generated using the sinusoid RRO value and the WRRO value.

The WRRO values are typically learned and then written to the disk as part of the disk drive manufacturing process. It is therefore desirable to minimize the time it takes to write the WRRO values to the disk in order to minimize the bottleneck and corresponding manufacturing expense.

SUMMARY OF THE EMBODIMENTS OF THE INVENTION

An embodiment of the present invention comprises a disk drive including a disk comprising a plurality of servo sectors that define a plurality of tracks, and a head actuated radially over the disk, wherein the head comprises a read element radially offset from a write element. The read element is positioned over a first track, and the first track is read to generate first read wedge repeatable runout (WRRO) values. A first seek operation of the head positions the read element over a second track, and the second track is read to generate first write WRRO values. The first write WRRO values are used to write the first read WRRO values to the first track. A second seek operation of the head positions the read element over a third track, and the third track is read to generate second write WRRO values. The second write WRRO values are used to write the first write WRRO values to the second track.

In one embodiment, the WRRO values are written from an inner diameter of the disk toward a middle diameter of the disk and from an outer diameter of the disk toward the middle diameter of the disk.

In another embodiment, the first seek is performed in a first direction and thereafter the second seek is performed in the first direction without seeking the head in a second direction opposite the first direction.

In yet another embodiment, the read element leads the write element in the first direction.

In still another embodiment, a radial distance between the first and second tracks comprises the radial offset between the read element and the write element. In one embodiment, the radial offset is due at least in part to a skew angle.

In another embodiment, second read WRRO values are read for the second track together with the first write WRRO values. In one embodiment, the second read WRRO values and the first write WRRO values are written on servo wedges for the second track by alternating between writing the second read WRRO values and the first write WRRO values for each servo wedge, and in one embodiment, the first write WRRO values are written at a different radial location than the second read WRRO values.

In yet another embodiment, after writing the first read WRRO values the first read WRRO values are trimmed, and after writing the first write WRRO values, the first write WRRO values are trimmed.

Another embodiment of the present invention comprises a method of writing wedge repeatable runout (WRRO) values to a disk of a disk drive, the disk drive comprising the disk having a plurality of servo sectors that define a plurality of tracks, and a head actuated radially over the disk, wherein the head comprises a read element radially offset from a write element. The read element is positioned over a first track, and the first track is read to generate first read wedge repeatable runout (WRRO) values. A first seek operation of the head positions the read element over a second track, and the second track is read to generate first write WRRO values. The first write WRRO values are used to write the first read WRRO values to the first track. A second seek operation of the head positions the read element over a third track, and the third track is read to generate second write WRRO values. The second write WRRO values are used to write the first write WRRO values to the second track.

DETAILED DESCRIPTION OF EMBODIMENTS OF THE INVENTION

Figures 1A, 1B, 1C:
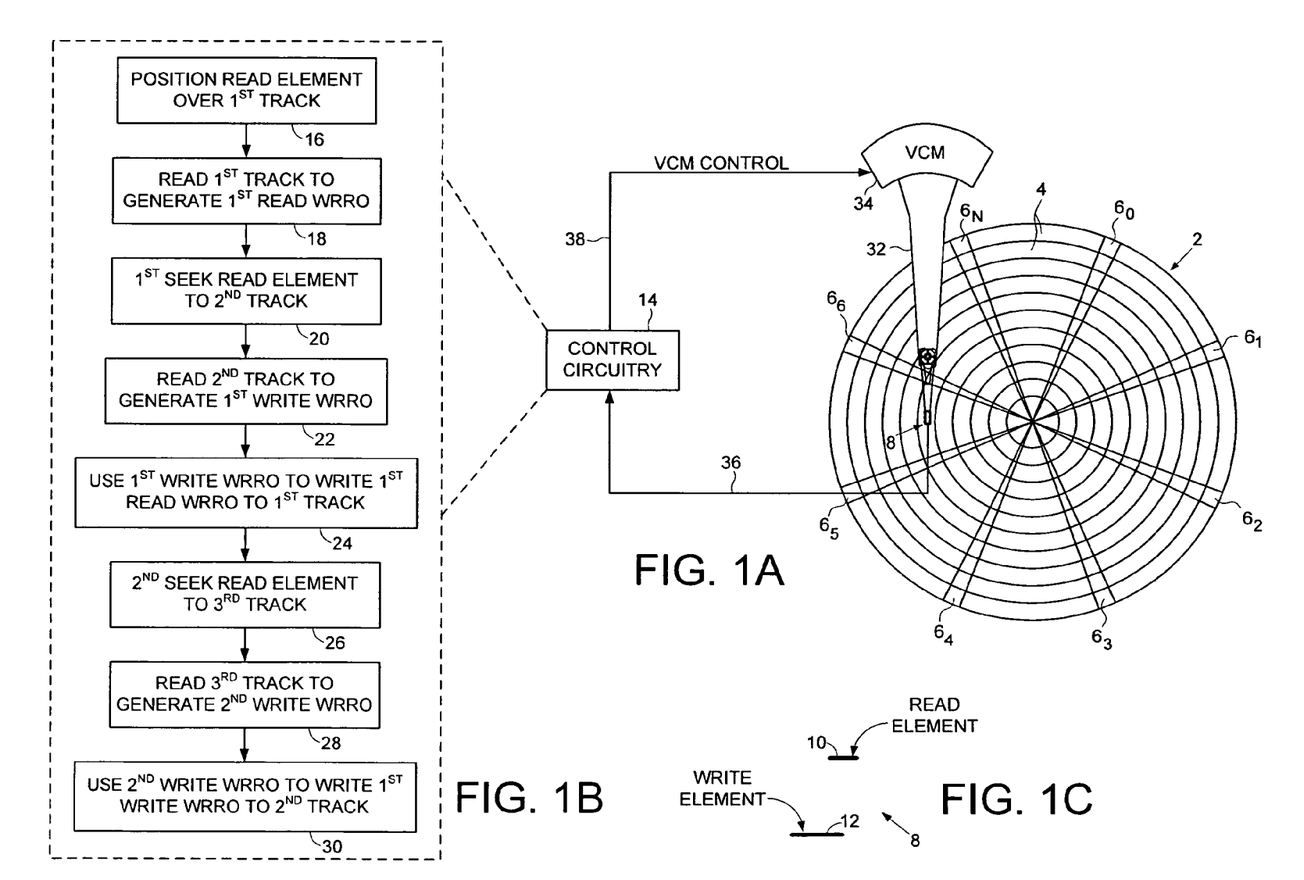
FIG. 1A shows a disk drive according to an embodiment of the present invention comprising a disk, a head actuated radially over the disk by a voice coil motor (VCM), and control circuitry.
FIG. 1B is a flow diagram according to an embodiment of the present invention executed by the control circuitry for writing WRRO values to the disk.
FIG. 1C shows a head according to an embodiment of the present invention comprising a read element radially offset from a write element.

FIG. 1A shows a disk drive according to an embodiment of the present invention comprising a disk 2 having a plurality of servo sectors $6_0$-$6_N$ that define a plurality of tracks 4, and a head 8 actuated radially over the disk 2, wherein the head 8 comprises a read element 10 radially offset from a write element 12 (FIG. 1C). The disk drive further comprises control circuitry 14 for executing the flow diagram of FIG. 1B, wherein the read element 10 is positioned over a first track (step 16), and the first track is read to generate first read wedge repeatable runout (WRRO) values (step 18). A first seek operation of the head positions the read element over a second track (step 20), and the second track is read to generate first write WRRO values (step 22). The first write WRRO values are used to write the first read WRRO values to the first track (step 24). A second seek operation of the head positions the read element over a third track (step 26), and the third track is read to generate second write WRRO values (step 28). The second write WRRO values are used to write the first write WRRO values to the second track (step 30).

In the embodiment of FIG. 1A, the head 8 is connected to a distal end of an actuator arm 32 which is rotated about a pivot by a voice coil motor (VCM) 34 in order to actuate the head 8 radially over the disk 2. In the embodiment of FIG. 1C, the read element 10 is separated from the write element 12 in-line with the actuator arm 32 by a reader/writer gap. This means that as the actuator arm 32 rotates to position the head 8 away from the middle diameter of the disk, the resulting head skew angle will modify the reader/writer offset. Therefore, in one embodiment the read/writer offset is due to a physical offset between the center of the read element 10 and the center of the write element 12 as well as a head skew angle that varies with the radial location of the head 8.

The control circuitry 14 processes the read signal 36 emanating from the head 8 to demodulate the information in the servo sectors $6_0$-$6_N$. The demodulated servo information (position error signal) is then processed (e.g., using appropriate compensation filtering) to generate a position control signal 38 applied to the VCM 34 in order to position the head 8 over a target data track (seek to the target data track and track the centerline of the target data track).

Figure 2:
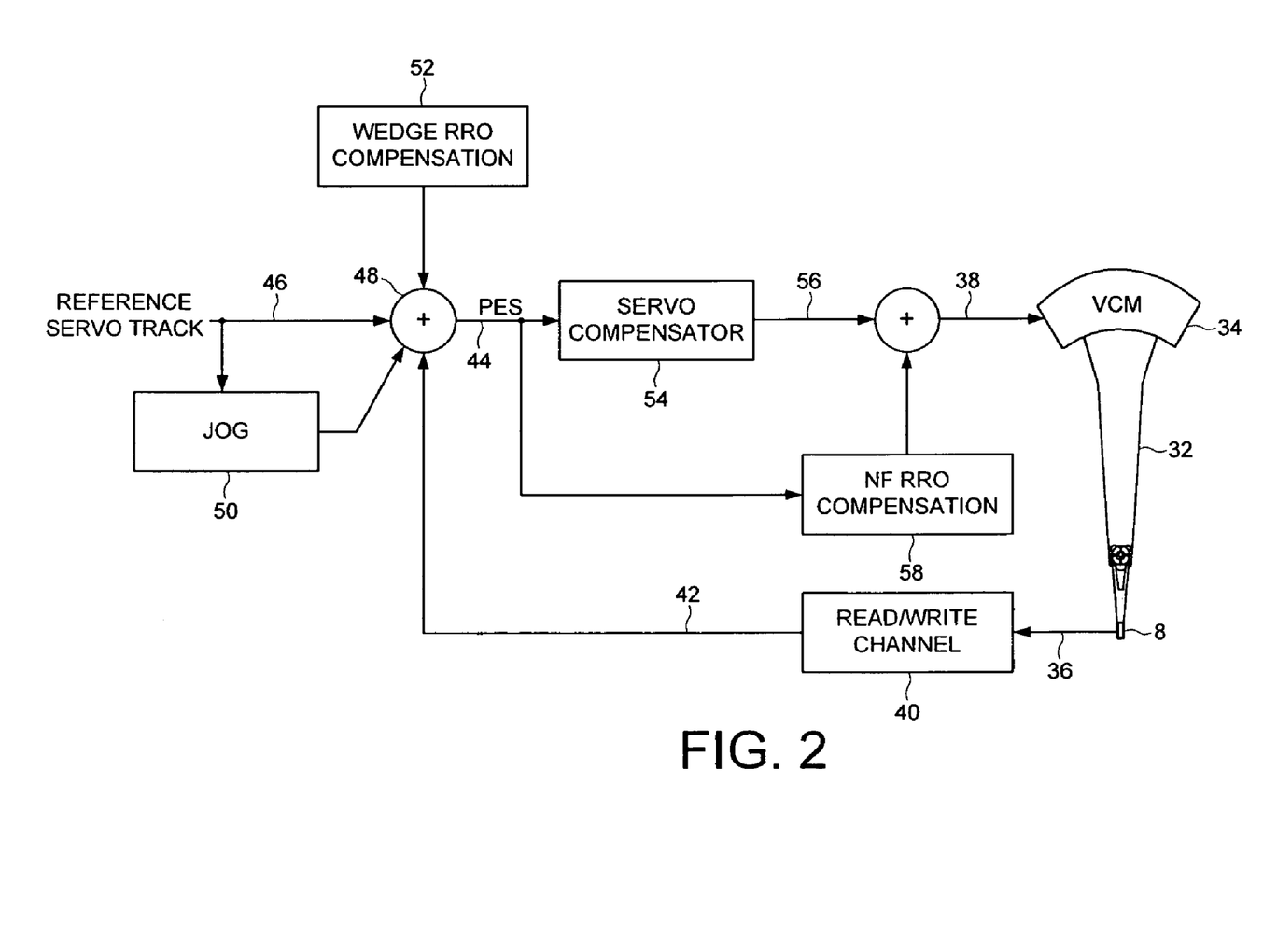
FIG. 2 shows control circuitry according to an embodiment of the present invention for generating a control signal applied to the VCM in response to the WRRO values.

FIG. 2 shows control circuitry 14 according to an embodiment of the present invention for generating the control signal 38 applied to the VCM 34 in order to position the head 8 over the disk 2. As the head 8 reads the servo sectors $6_0$-$6_N$ on the disk 2, a read/write channel 40 demodulates the read signal 36 into an estimated head position 42 relative to the servo sectors $6_0$-$6_N$. A position error signal (PES) 44 is generated by comparing the head position 42 to a reference servo track 46 at adder 48. The PES 44 is adjusted by a jog value 50 which accounts for the reader/writer offset (FIG. 1C). The PES 44 is also adjusted by WRRO compensation 52 generated by reading the WRRO values recorded in the reference servo track 46 (e.g., to cancel the higher frequency RRO from the PES). A servo compensator 54 filters the PES 44 using a suitable compensation filter to generate a preliminary control signal 56. The preliminary control signal 56 is adjusted by NF RRO compensation 58 so that the head 8 follows the NF RRO (feedforward compensation). The NF RRO compensation 58 may help compensate for any suitable frequency, such as the fundamental frequency or 1F, or the harmonics. In one embodiment, the NF RRO compensation 58 is generated by evaluating the PES 44 during a calibration procedure using any suitable algorithm.

Figure 3:
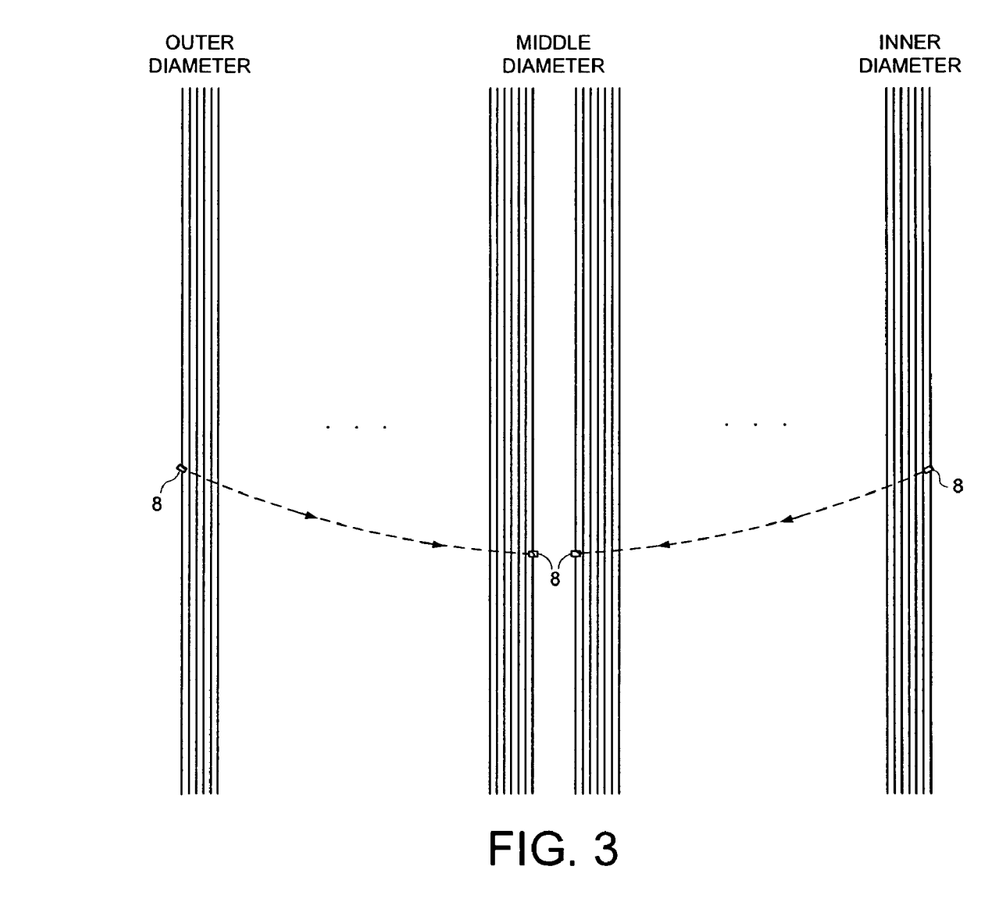
FIG. 3 illustrates an embodiment of the present invention wherein the WRRO values are written from an outer diameter of the disk toward a middle diameter and from an inner diameter toward the middle diameter.

In the embodiment shown in FIG. 1C, the head 8 is manufactured such that the read element 10 is behind the write element 12 (the write element 12 being further from the base of the actuator arm 32). In this configuration, when the head 8 is positioned at the outer diameter of the disk and moved toward the middle diameter as illustrated in FIG. 3, the read element 10 will lead the write element 12 in the direction of movement as the head 8 seeks from track to track as illustrated in FIGS. 4A-4F. Similarly in this configuration, when the head 8 is positioned at the inner diameter of the disk and moved toward the middle diameter as illustrated in FIG. 3, the read element 10 will lead the write element 12 in the direction of movement as the head 8 seeks from track to track as illustrated in FIGS. 5A-5F. In one embodiment, the middle diameter track which the head moves towards corresponds to a radial location where the head skew angle is substantially zero.

In alternative embodiment, the configuration of the head 8 is reversed in FIG. 1C such that the write element 12 is located behind the read element 10 (the read element 10 being further from the base of the actuator arm 32). In this configuration, when the head 8 is positioned at the middle diameter of the disk and moved toward the outer diameter, the read element 10 will lead the write element 12 in the direction of movement as the head 8 seeks from track to track. Similarly in this configuration, when the head 8 is positioned at the middle diameter of the disk and moved toward the inner diameter, the read element 10 will lead the write element 12 in the direction of movement as the head 8 seeks from track to track.

Figure 4A:
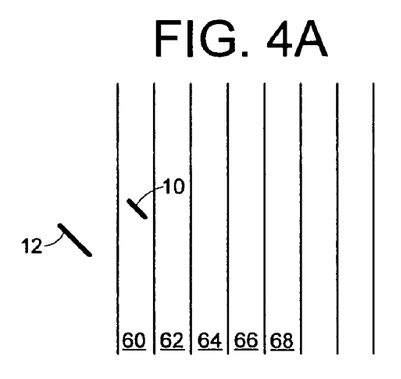
FIGS. 4A-4F illustrate generating and writing WRRO values as the head is moved from an outer diameter of the disk toward a middle diameter of the disk according to an embodiment of the present invention.
Figure 4B:
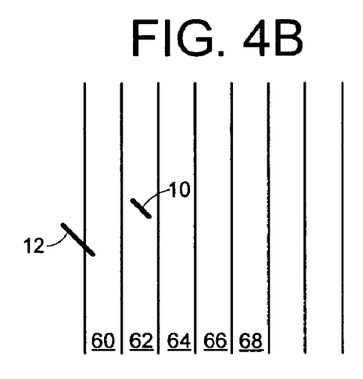
Figure 4C:
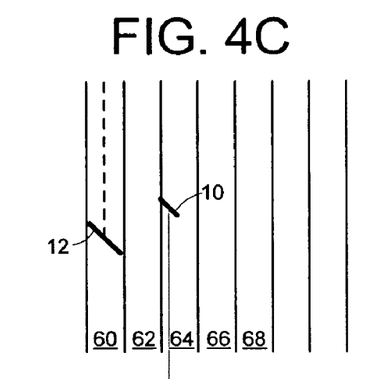

With the read element 10 leading the write element in the direction of movement, in one embodiment it is possible to generate and write the WRRO values without needing to perform reverse seeks (i.e., the seeks are in one direction). This embodiment is illustrated in FIGS. 4A-4F when writing the WRRO values from the outer diameter of the disk toward the inner diameter of the disk. In FIG. 4A, the read element 10 is positioned over the outer most track 60 (step 16 of FIG. 1B) which is read to generate first read WRRO values (step 18 of FIG. 1B) which are stored in memory. The control circuitry 14 then seeks the head toward the middle diameter in order to position the read element 10 over the next track 62. The next track 62 is read to generate read WRRO values which are stored in memory. The control circuitry 14 then seeks the head (step 20 of FIG. 1B) toward the middle diameter in order to position the read element 10 over a track 64 (offset by a jog) that corresponds to the write element 12 being positioned over the center of track 60. Track 64 is then read to generate first write WRRO values (step 22 of FIG. 1B) which are stored in memory. The first write WRRO values are also used in the servo system of FIG. 2 in order to write the first read WRRO values stored in memory to the first track 60 as indicated by the dashed line in FIG. 4C (step 24 of FIG. 1B).

Figure 4D:
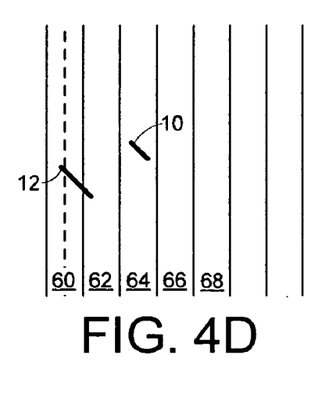
Figure 4E:
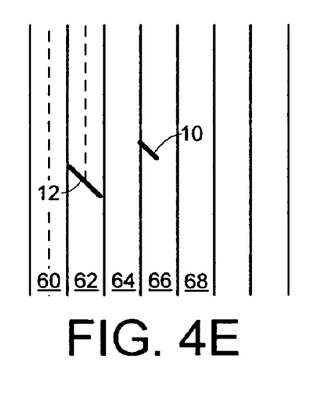
Figure 4F:
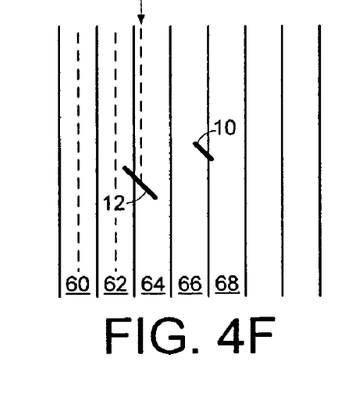
Figure 5A:
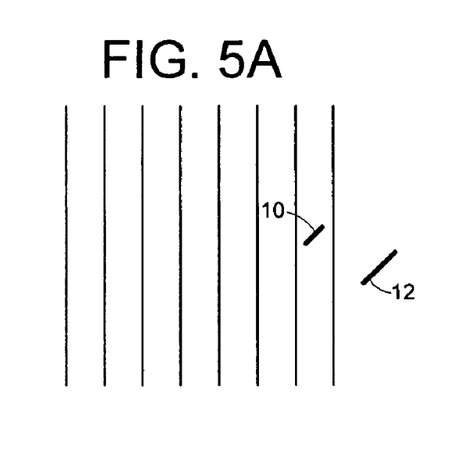
FIGS. 5A-5F illustrate generating and writing WRRO values as the head is moved from an inner diameter of the disk toward a middle diameter of the disk according to an embodiment of the present invention.
Figure 5B:
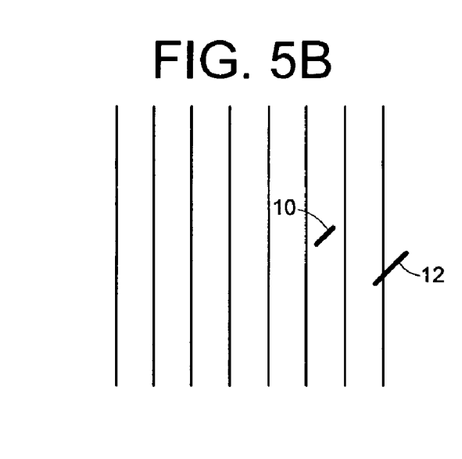
Figure 5C:
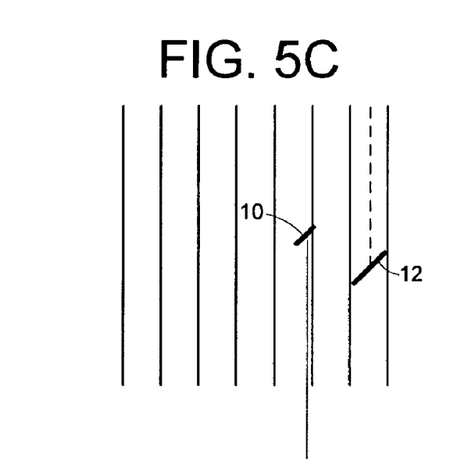
Figure 5D:
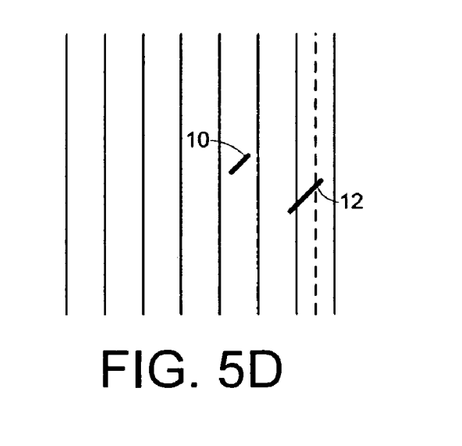
Figure 5E:
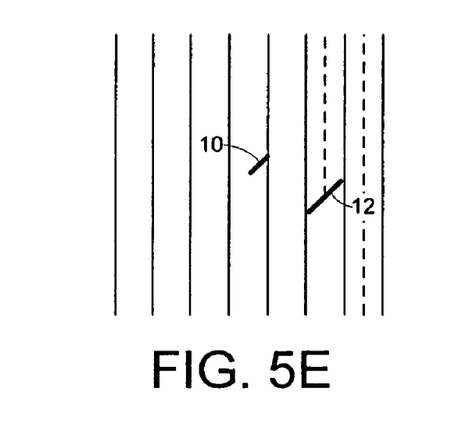
Figure 5F:
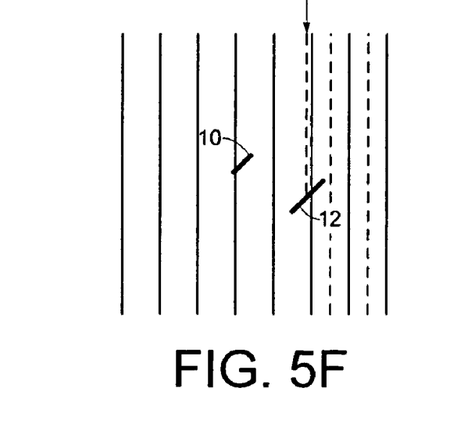

This process continues as shown in FIGS. 4D and 4E until the control circuitry 14 eventually seeks the head (step 26 of FIG. 1B) toward the middle diameter in order position the read element 10 over a track 66 (offset by a jog) that corresponds to the write element 12 being positioned to write the first write WRRO values stored in memory to track 64 as illustrated by the dashed line in FIG. 4F. That is, the first write WRRO values that were generated in FIG. 4C are stored in memory and eventually written to track 64 once the write element 12 is positioned over the same location as shown in FIG. 4F. Prior to writing the first write WRRO values to track 64, the head is positioned over track 66 (offset by a jog) and track 66 is read in order to generate second write WRRO values (step 28 of FIG. 1B) which are used in the servo system of FIG. 2 to write the first WRRO values to track 64. The read element 10 is then positioned over track 68 (offset by a jog) in order to position the write element 12 over the center of track 64 so that the corresponding read WRRO values for track 64 can be written. Accordingly, once the head moves far enough in from the outer diameter, read and write WRRO values are written to each track, wherein the read WRRO values are written along the track's centerline, and the write WRRO values are typically written along a path offset from the track's centerline as shown in FIG. 4F.

Most of the time the second write WRRO values (e.g., generated in FIG. 4F) are discarded since they are not needed again (not written to the disk). However, there are times when the head skew angle is such that the second write WRRO values also correspond to the read WRRO values for a track the read element is positioned over. In other words, there are times that the write WRRO values and the read WRRO values for a track are aligned (along the track's centerline in one embodiment). In this case, the second write WRRO values are stored in memory as both the write WRRO values for the track as well as the read WRRO values for the track.

A similar illustration when writing the WRRO values from the inner diameter of the disk toward the middle diameter is shown in FIGS. 5A-5F. Note that in the embodiment of FIGS. 4A-4F and 5A-5F the read element 10 leads the write element 12 in the direction of seeking toward the middle diameter of the disk. This aspect enables the writing of WRRO values without reversing the seek direction by generating the read and write WRRO values using the read element 10, and storing the WRRO values in memory until the write element 12 is positioned over the appropriate radial location to write the WRRO values.

Figure 6:
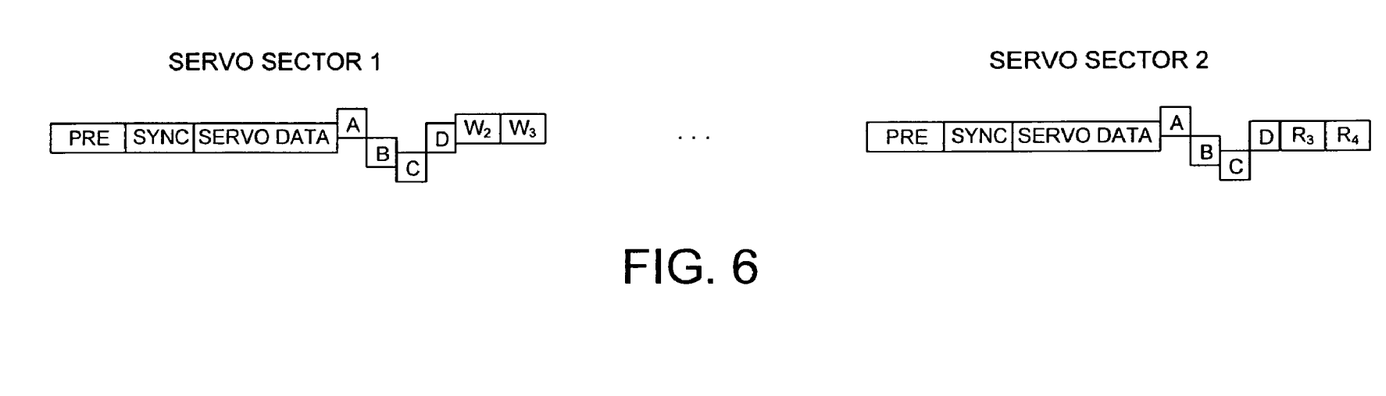
FIG. 6 shows a first servo sector comprising write WRRO values and a following servo sector comprising read WRRO values according to an embodiment of the present invention.

FIG. 6 shows an embodiment of the present invention wherein the write WWRO values for two of the following servo sectors are written in the odd servo sectors, and the read WRRO values for two of the following servo sectors are written in the even servo sectors. For example, servo sector 1 comprises the write WRRO value $W_2$ for servo sector 2 and the write WRRO value $W_3$ for servo sector 3, and servo sector 2 comprises the read WRRO value $R_3$ for servo sector 3 and the read WRRO value $R_4$ for servo sector 4. When a servo sector is read, the WRRO values are read and stored in memory and then used in FIG. 2 as compensation 52 for the following servo sectors. Note that in the example of FIG. 6, the write WRRO values are offset from the track centerline similar to FIG. 4F, but they may also be aligned with the track centerline depending on the head skew angle. The WRRO values may be written at any suitable location on the disk and at any suitable data rate, such as in the servo data field of a servo sector at the servo data rate, or just prior or following a servo sector at the user data rate.

Figure 7A:
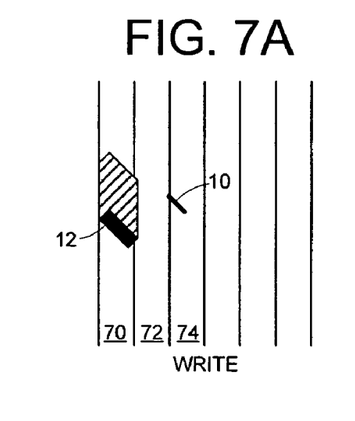
FIGS. 7A-7C illustrate how the skew angle of the head may increase inter-track interference (ITI) when reading the WRRO values.
Figure 7B:
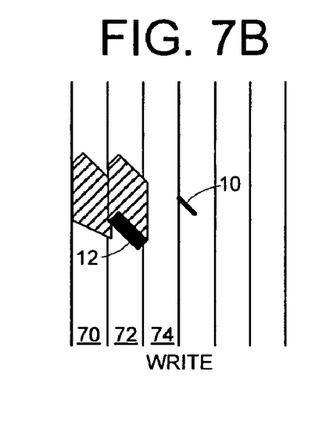
Figure 7C:
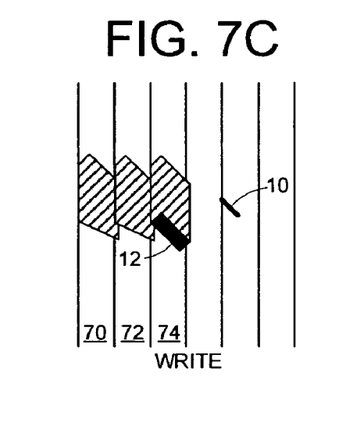

FIGS. 7A-7C and 8A-8D illustrate another embodiment of the present invention wherein the WRRO values are trimmed in order to reduce inter-track interference (ITI). In this embodiment, the write element 12 is substantially rectangular such that the head skew angle causes a portion of the WRRO value to be written near or even onto the adjacent track. This is illustrated in FIG. 7A wherein a portion of the WRRO values written to track 70 is also written to track 72. In FIG. 7B, even though the write element 12 may overwrite the residual WRRO values written to track 70 when writing the WRRO values to track 72, the resulting WRRO values are written very close or even adjacent to one another as illustrated in FIG. 7C. As a result, when reading the WRRO values (e.g., from track 72 in FIG. 7C) and there is a tracking error (read element 10 being radially offset), the ITI from either of the adjacent tracks (70 or 74) may render the WRRO values written to track 72 unreadable.

Figure 8A:
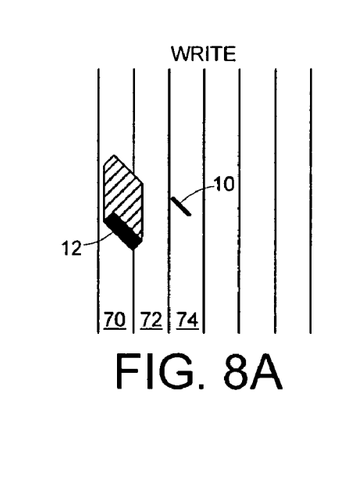
FIGS. 8A-8D illustrate an embodiment of the present invention wherein the WRRO values are trimmed when written to the disk in order to reduce ITI.
Figure 8B:
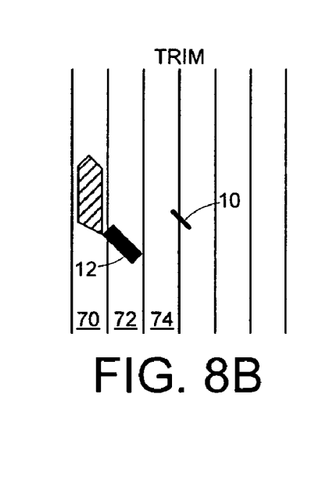
Figure 8C:
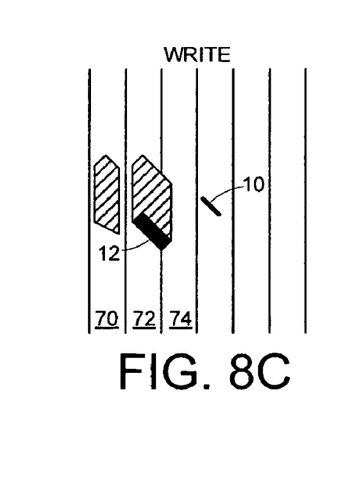
Figure 8D:
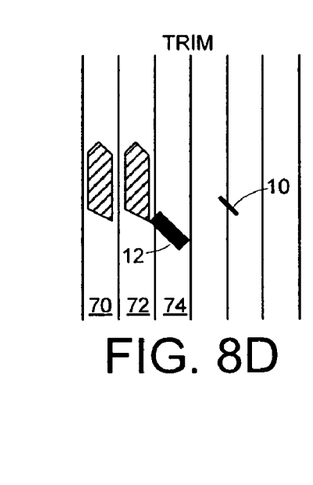

Accordingly, in an embodiment shown in FIGS. 8A-8D the WRRO values are trimmed when written to the disk in order to reduce the ITI from adjacent tracks. After writing the WRRO values to track 70 as shown in FIG. 8A, the head is offset radially as shown in FIG. 8B and the WRRO values written to track 70 are trimmed. In one embodiment the read head is offset radially when initially writing the WRRO values to increase the gap between WRRO values of adjacent tracks as illustrated in FIGS. 8A and 8C. As seen in FIG. 8D, the trimming effect of this embodiment results in a clearance gap between the WRRO values of adjacent tracks which helps reduce ITI when reading the WRRO values. The WRRO values may be trimmed in any suitable manner, such as by writing a suitable DC or AC pattern to the disk.

Figure 9:
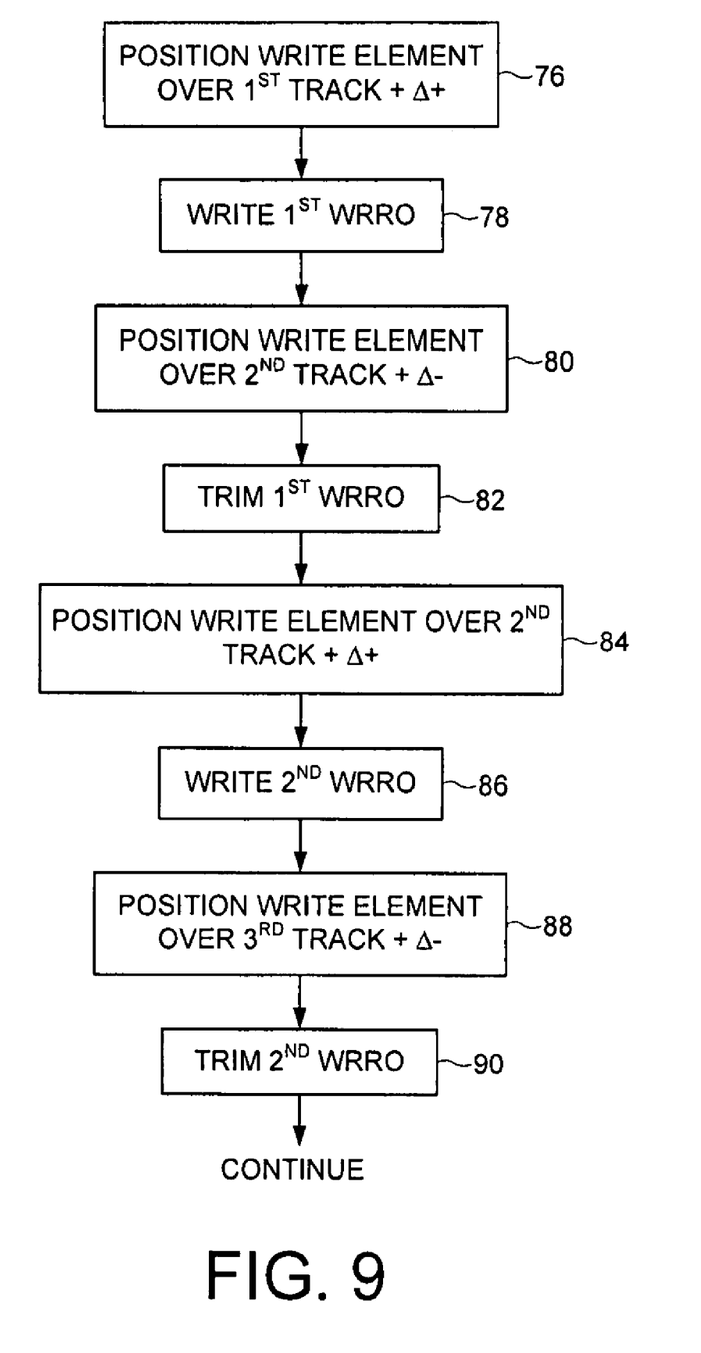
FIG. 9 is a flow diagram according to an embodiment of the present invention executed by the control circuitry in order to trim the WRRO values when written to the disk.

FIG. 9 is a flow diagram executed by the control circuitry 14 according to an embodiment of the present invention wherein the WRRO values are trimmed. The write element is positioned over a first track (step 76) such as track 70 of FIG. 8A with a suitable positive offset ($\Delta+$) which may be implemented as a jog 50 in FIG. 2. First WRRO values are written (step 78) and the head is then positioned over a second track (step 80) such as track 72 of FIG. 8B with a suitable negative offset ($\Delta-$). The first WRRO values are then trimmed (step 82) such as shown in FIG. 8B. The write element is then positioned over a second track (step 84) such as track 72 of FIG. 8C with a suitable positive offset ($\Delta+$), and second WRRO values are written (step 86). The write element is then positioned over a third track (step 88) such as track 74 of FIG. 8D with a suitable negative offset ($\Delta-$), and the second WRRO values are trimmed (step 90) such as shown in FIG. 8D. This process continues from the outer diameter of the disk toward the middle diameter, and then from the inner diameter to the middle diameter (in one embodiment).

Any suitable control circuitry 14 may be employed in the embodiments of the present invention, such as any suitable integrated circuit or circuits. For example, the control circuitry 14 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 14 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 2 and read into a volatile semiconductor memory when the disk drive is powered on. In yet another embodiment, the control circuitry 14 comprises suitable logic circuitry, such as state machine circuitry.

What is claimed is:

1. A disk drive comprising:
   a disk comprising a plurality of servo sectors for defining a plurality of tracks;
   a head actuated radially over the disk, wherein the head comprises a read element radially offset from a write element; and
   control circuitry operable to:
   position the read element over a first track;
   read the first track to generate first read wedge repeatable runout (WRRO) values;
   first seek the head to position the read element over a second track;
   read the second track to generate first write WRRO values;
   use the first write WRRO values to write the first generated read WRRO values to the first track;
   second seek the head to position the read element over a third track;
   read the third track to generate second write WRRO values; and
   use the second write WRRO values to write the first generated write WRRO values to the second track.

2. The disk drive as recited in claim 1, wherein the control circuitry is further operable to write the WRRO values from an inner diameter of the disk toward a middle diameter of the disk and to write the WRRO values from an outer diameter of the disk toward the middle diameter of the disk.

3. The disk drive as recited in claim 1, wherein the control circuitry is further operable to perform the first seek in a first direction and thereafter perform the second seek in the first direction without seeking the head in a second direction opposite the first direction.

4. The disk drive as recited in claim 1, wherein the read element leads the write element in the first direction.

5. The disk drive as recited in claim 1, wherein a radial distance between the first and second tracks comprises the radial offset between the read element and the write element.

6. The disk drive as recited in claim 5, wherein the radial offset is due at least in part to a skew angle.

7. The disk drive as recited in claim 1, wherein second read WRRO values are generated for the second track together with the first generated write WRRO values.

8. The disk drive as recited in claim 7, wherein the second generated read WRRO values and the first generated write WRRO values are written on servo wedges for the second track by alternating between writing the second generated read WRRO values and the first generated write WRRO values for each servo wedge.

9. The disk drive as recited in claim 7, wherein the second generated read WRRO values are written on even servo wedges for the second track during a first revolution of the disk and the first generated write WRRO values are written on odd servo wedges for the second track during a second revolution of the disk.

10. The disk drive as recited in claim 9, wherein the first generated write WRRO values are written at a different radial location than the second generated read WRRO values.

11. The disk drive as recited in claim 1, wherein after writing the first generated read WRRO values the control circuitry is further operable to trim the first generated read WRRO values, and after writing the first generated write WRRO values, the control circuitry is further operable to trim the first generated write WRRO values.

12. A method of writing wedge repeatable runout (WRRO) values to a disk of a disk drive, the disk drive comprising the disk having a plurality of servo sectors that define a plurality of tracks, a head actuated radially over the disk, wherein the head comprises a read element radially offset from a write element, the method comprising:
   positioning the read element over a first track;
   reading the first track to generate first read wedge repeatable runout (WRRO) values;
   first seeking the head to position the read element over a second track;
   reading the second track to generate first write WRRO values;
   using the first write WRRO values to write the first generated read WRRO values to the first track;
   second seeking the head to position the read element over a third track;
   reading the third track to generate second write WRRO values; and
   using the second write WRRO values to write the first generated write WRRO values to the second track.

13. The method as recited in claim 12, further comprising writing the WRRO values from an inner diameter of the disk toward a middle diameter of the disk and writing the WRRO values from an outer diameter of the disk toward the middle diameter of the disk.

14. The method as recited in claim 12, further comprising performing the first seek in a first direction and thereafter performing the second seek in the first direction without seeking the head in a second direction opposite the first direction.

15. The method as recited in claim 12, wherein the read element leads the write element in the first direction.

16. The method as recited in claim 12, wherein a radial distance between the first and second tracks comprises the radial offset between the read element and the write element.

17. The method as recited in claim 16, wherein the radial offset is due at least in part to a skew angle.

18. The method as recited in claim 12, further comprising generating second read WRRO values for the second track together with the first write WRRO values.

19. The method as recited in claim 18, wherein the second generated read WRRO values and the first generated write WRRO values are written on servo wedges for the second track by alternating between writing the second generated read WRRO values and the first generated write WRRO values for each servo wedge.

20. The method as recited in claim 18, wherein the second generated read WRRO values are written on even servo wedges for the second track during a first revolution of the disk and the first generated write WRRO values are written on odd servo wedges for the second track during a second revolution of the disk.

21. The method as recited in claim 20, wherein the first generated write WRRO values are written at a different radial location than the second generated read WRRO values.

22. The method as recited in claim 12, wherein after writing the first generated read WRRO values, further comprising trimming the first generated read WRRO values, and after writing the first generated write WRRO values, further comprising trimming the first generated write WRRO values.

23. A disk drive comprising:
   a disk comprising a plurality of servo sectors that define a plurality of tracks;
   a head actuated radially over the disk, wherein the head comprises a read element radially offset from a write element;
   a means for positioning the read element over a first track;
   a means for reading the first track to generate first read wedge repeatable runout (WRRO) values;
   a means for first seeking the head to position the read element over a second track;
   a means for reading the second track to generate first write WRRO values;
   a means for using the first write WRRO values to write the first generated read WRRO values to the first track;
   a means for second seeking the head to position the read element over a third track;
   a means for reading the third track to generate second write WRRO values; and
   a means for using the second write WRRO values to write the first generated write WRRO values to the second track.

* * * * *